United States Patent [19]

Nishiura et al.

[11] Patent Number: 5,365,339
[45] Date of Patent: Nov. 15, 1994

[54] TWO DEPOLARIZER FIBER-OPTIC GYROSCOPE THAT ELIMINATES INTERFERENCE BETWEEN THE DEPOLARIZERS

[75] Inventors: Yozo Nishiura; Yasuhiko Nishi, both of Osaka, Japan

[73] Assignee: Sumitomo Electric Industries, Ltd., Osaka, Japan

[21] Appl. No.: 2,060

[22] Filed: Jan. 8, 1993

Related U.S. Application Data

[63] Continuation-in-part of Ser. No. 911,612, Jul. 10, 1992.

[30] Foreign Application Priority Data

Jul. 12, 1991 [JP] Japan .................. 3-198534
Apr. 30, 1992 [JP] Japan .................. 4-139899
Jul. 7, 1992 [JP] Japan .................. 4-204382
Dec. 11, 1992 [JP] Japan .................. 4-353422

[51] Int. Cl.$^5$ .................................. G01C 19/64
[52] U.S. Cl. .................................. 356/350
[58] Field of Search .................................. 356/350

[56] References Cited

U.S. PATENT DOCUMENTS 4,529,313 7/1985 Petermann et al. .................. 356/350
4,572,608 2/1986 Mochizuki et al. .................. 385/11

FOREIGN PATENT DOCUMENTS 0474389 3/1992 European Pat. Off. .
3115804 11/1982 Germany .

OTHER PUBLICATIONS

Bohm et al, "Low-Drift Fibre Gyro Using a Superluminescent Diode", Electronics Letters, vol. 17, No. 10, May 1981, pp. 352–353.

Primary Examiner—Vincent P. McGraw
Attorney, Agent, or Firm—Cushman, Darby & Cushman

[57] ABSTRACT

A fiber-optic gyroscope has a polarizer, a fiber coil and couplers. A light beam is polarized, divided into two beams and introduced into the fiber coil. Two depolarizers are provided; one between a light source and a polarizer, the other between the fiber coil and a coupler. To clarify the condition for avoiding interference between two depolarizers is a purpose of this invention. Four birefringent materials A, B C and D should satisfy inequalities;

$$|P_aB_aL_a + P_bB_bL_b + P_oB_oL_o + P_dB_dL_d| - B_5L_5 > C$$

where $P_a$, $P_b$, $P_o$, and $P_d$ are triplet factors which take one of $-1$, 0 or $+1$ independently, $B_a$, $B_b$, $B_o$ and $B_d$ are birefringence and $L_a$, $L_b$, $L_o$ and $L_d$ are lengths of A, B, D and D. $B_5L_5$ is extra birefringency of the fiber coil or couplers.

20 Claims, 9 Drawing Sheets

Birefringence in a single mode fiber coil and couplers

BIREFRINGENT MATERIAL

POLARIZER

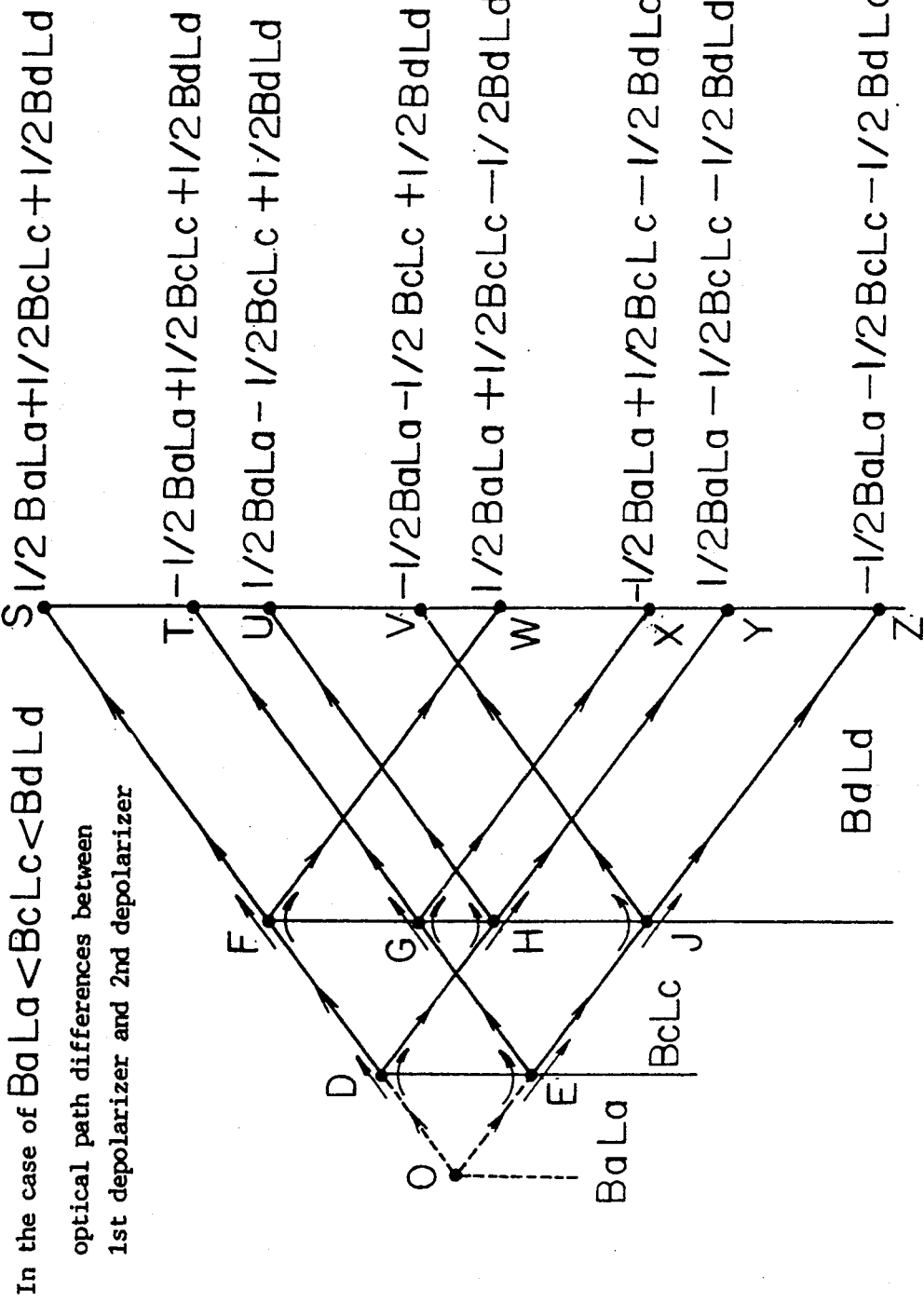

TWO DEPOLARIZER FIBER-OPTIC GYROSCOPE THAT ELIMINATES INTERFERENCE BETWEEN THE DEPOLARIZERS

This application is a continuation-in-part application of application Ser. No. 07/911,612 filed on Jul. 10, 1992.

FIELD OF THE INVENTION

This CIP application claims the priority of Japanese Patent Applications No. 204382/1992 filed Jul. 7, 1992 and No. 353422/1992 filed Dec. 11, 1992, which are incorporated herein by reference.

This invention relates to a fiber-optic gyroscope for measuring an angular velocity of an automobile, airplane, ship or other rotating thing. Especially, this invention proposes an improvement of the fiber-optic gyroscope in which two depolarizers are included but no interference between them occurs. Here, the word "depolarizer" includes also a "quasi-depolarizer" which is constructed with a single birefringent material and a polarizer besides a genuine depolarizer having two birefringent materials. Furthermore, this invention will propose a fiber-optic gyroscope enabling us to eliminate the interference between the depolarizers even in the presence of accidental birefringence of a single-mode fiber coil or couplers. No prior invention nor treatise on a fiber-optic gyroscope has dealt with the interference between two depolarizers. This invention is fully novel on this account.

BACKGROUND OF THE INVENTION

A fiber-optic gyroscope measures an angular velocity of a fiber coil by utilizing the fact that the angular velocity is in proportion to the phase difference between a clockwise-propagating beam and a counterclockwise-propagating beam (Sagnac Effect). Optical fiber gyroscopes can be classified by the methods of modulation of signals, e.g. phase modulation type, frequency modulation type, or phase-shift type. For example, the phase modulation type modulates the phase of light beams propagating in a fiber coil by expanding or shrinking a part of the optical fiber in the vicinity of the fiber coil at a definite frequency (modulation frequency). A photodetector detects the intensity of interfering (clockwise and counterclockwise) beams. The output of the photodetector includes a fundamental wave of the modulation frequency and the harmonics as an expansion of the coefficients of Bessel functions. Thus, the fundamental signal or arbitrary harmonics can be obtained by synchronous demodulation of the output signal by a modulation frequency carrier or harmonics carrier which is yielded from the modulation signal.

Since a fiber-optic gyroscope makes a clockwise beam interfere with a counterclockwise beam, the polarization planes of both beams must be the same. Coincidence of the polarization planes enables two beams to interfere with each other. When the polarization planes of the beams are different, the intensity of the interfering beams reduces by a factor of cosine of the angle held between two polarization planes. If the polarization planes are perpendicular to each other, two beams cannot interfere at all.

A fiber coil is produced from a single-mode fiber in ordinary cases. A single-mode optical fiber allows the rotation of polarization planes, because two beams with polarization planes perpendicular to each other degenerate with regard to the phase constants (propagation constants). If the polarization planes accidentally rotate in a single-mode fiber, the polarization planes of clockwise- and counterclockwise- beams become different and the intensity of the output power of the photodetector will fluctuate according to the rotation of the polarization planes.

K. Boehm et al. had proposed an improved fiber-optic gyroscope provided with a depolarizer in a part of a fiber coil to avoid the fluctuation of the output signal owing to the rotation of the polarization planes.

K. Boehm et al.: "Low-Drift Fiber Gyro Using a Superluminescent Diode", ELECTRONICS LETTERS, Vol. 17, No. 10, p. 352(1981)

The gyroscope has used a Lyot Depolarizer which is constructed with two birefringent materials with thicknesses in a ratio of 2:1, being bonded with optical principal axes twisted at 45 degrees. A depolarizer depolarizes any light beams, e.g. linearly-polarized beams, circularly-polarized beams or elliptically-polarized beams. A depolarizer enables clockwise- and counterclockwise-propagating beams to interfere with each other, irrespective of original states of polarization before the beams pass through the depolarizer. Accidental rotations of the polarization planes in a single-mode fiber coil had been solved by supplying a depolarizer to a part of the fiber coil. Even if the polarization of beams rotated by 90 degrees in the fiber coil by some reasons, half of the power of beams can pass through the polarizer in the reciprocal direction because the beams are fully depolarized and can interfere at the photodetector. Without a depolarizer, the beam with a 90 degree rotated polarization plane could not pass through the polarizer at all in the reciprocal direction.

However, Boehmps fiber-optic gyroscope with a single depolarizer had a new drawback that the adjustment of the polarization of the original beam just emitted from a light source with the polarization plane of the propagating beams became impossible, because the newly-installed depolarizer vanishes the memory of the polarization of the propagating beams. Without a depolarizer, it is possible to maximize the output power at the photodetector by harmonizing the direction of the polarization of the initial beam just emitted from the light source with the allowable axis of the polarizer. On the other hand, Boehm's gyroscope have not solved another inherent difficulty of polarization rotation in the single-mode fiber between the light source and the polarizer.

To solve the difficulties more completely, the Inventors have proposed a more advanced fiber-optic gyroscope provided with two depolarizers, i.e. first depolarizer in front of the polarizer and second depolarizer in the vicinity of the fiber coil like Boehm's fiber-optic gyroscope. The first one was a novel point in the gyroscope. It has been disclosed by;

(1) Japanese Patent Laying Open No. 4-106416 (106416/1992)
(2) Japanese Patent Laying Open No. 4-106420 (106420/1992)
(3) Japanese Patent Laying Open No. 4-106417 (106417/1992)

Among three, (1) used a normal type depolarizer having two polarization maintaining fibers spliced together with their optical axes twisted at 45 degrees. The ratio of lengths of the polarization maintaining fibers was 2:1. This was a kind of Lyot depolarizer constructed with the polarization maintaining fibers. The length of the shorter one was determined by the condition that the optical path difference due to birefringence should be longer than the coherent length of the light emitted from the light source. Such a depolarizer has well-known as mentioned before as a Lyot depolarizer. Birefringent crystals were only replaced by birefringent optical fibers (i.e. polarization maintaining fibers). FIG. 7 exhibits a schematic view of the depolarizer constructed with fibers. FIG. 6 is a schematic view of an optic fiber gyroscope with two depolarizers proposed by the Inventors for the first time.

(2) constructed a substantial depolarizer consisting of a single polarization maintaining fiber facing toward a light source generating linearly-polarized light beams, in which an optical axis of the polarization maintaining fiber is twisted at 45 degrees to the polarization direction of the light source.

(3) constructed a substantial depolarizer consisting a single birefringent crystal placed in a special optical path of the beams just emitted from a light source with an optical principal axis twisted at 45 degrees to the polarization direction of the emitted linearly-polarized beams. A substantial depolarizer was produced by the polarization of the light source and a birefringent crystal.

All the three have proposed gyroscopes having two depolarizers. (1) has two independent, genuine depolarizers. (2) and (3) have a genuine depolarizer and a substantial depolarizer taking advantage of the polarization of the emitted light beams. Then, the Inventors have discovered the fact that one birefringent material becomes dispensable when a depolarizer shall installed in a fiber-optic gyroscope, adjoining a polarizer. Namely, only a single birefringent material can construct a substantial depolarizer adjacent to a polarizer. This depolarizer is an incomplete depolarizer dependent upon a polarizer. But the function is fully the same as an independent depolarizer. This is a depolarizer in a broad sense. Therefore, it will be called a quasi-depolarizer from now on. The Inventors have disclosed such a quasi-depolarizer by;

(4) Japanese Patent Application No. 3-198534 (filed on Jul. 12, 1991)

(5) Japanese Patent Application No. 4-139899 (filed on Apr. 30, 1992)

(4) has proposed a quasi-depolarizer constructed with a polarization maintaining fiber spliced to a front end of a fiber-type polarizer with their optical axes twisting at 45 degrees with each other. A fiber-type polarizer is a fiber coil made from a polarization maintaining fiber. This is one of polarizers. A polarizer has an allowable axis which is defined as the direction of polarization of the beams passing through the polarizer without loss. It has also a forbidden axis which is perpendicular to the allowable axis. The beam having the polarization plane parallel with the forbidden axis cannot pass through the polarizer. If the optical principal axis inclines at 45 degrees to the allowable axis of the polarizer, an ordinary beam and an extraordinary beam transmitted in the birefringent material are exactly divided in half into partial beams with the polarization planes parallel with the allowable axis and the other partial beams with the polarization planes parallel with the forbidden axis of the polarizer. The latter partial beams vanish in the polarizer. Only the former partial beams can pass through the polarizer. Thus, the ordinary beam and the extraordinary beam appear at the rear end of the polarizer at different states of phase. Of curse, the product of the length L of the polarization maintaining fiber and the birefringence $B = n_x - n_y$ has been determined to be longer than the coherent length C of the light source. Namely, $BL > C$. This inequality must hold in a depolarizer in every case.

FIG. 8 demonstrates the fiber-optic gyroscope proposed by the applications (4) and (5). There are two depolarizers. A first depolarizer just in front of a polarizer is a quasi-depolarizer. A second depolarizer lying in the vicinity of a fiber coil is a complete, independent depolarizer.

(5) used a general polarizer instead of a special type of depolarizer. Besides the first depolarizer, the second depolarizer was also simplified (mono-birefringent material) at the rear end of the polarizer. (5) was a generalization of (4). In any cases, the fiber-optic gyroscope required two depolarizers.

The Inventors believe that another depolarizer shall be provided between a light source and a polarizer, if there is a single-mode fiber between the light source and the polarized to avoid the fluctuation of the output signal owing to the rotation of the polarization planes. Inventions (1) to (3) belonged to such improvements requiring two depolarizers. Inventions (4) and (5) simplified the structure of a depolarizer.

Nobody has proposed the same improvements of fiber-optic gyroscope except the Inventors. Therefore, at present, nobody take notice of difficulties or problems regarding a new fiber-optic gyroscope having two depolarizers except the Inventors.

A depolarize is an optical device for converging a linearly-depolarized, circularly-polarized or elliptically-polarized beam into a depolarized beam. Essentially, two birefringent materials with thicknesses in a ratio of 2:1 are coupled with each other at 45 degrees of an angle between the optical axes of the materials. In the case of polarization maintaining fibers, the fundamental structure is the same. Furthermore, the difference of optical paths due to birefringence must be longer than the coherent length of the light emitted from a light source. Two differently-polarized (ordinary and extraordinary) beams cannot interfere, since the optical path difference is longer than the coherency of the light. Since the ratio of lengths is 2:1, partial beams with the same polarization plane are spaced by a common distance longer than the coherent length. Such partial beams do not interfere because of the distance longer than the coherent length, although they have the same polarization plane. A cross-term in the square of the amplitude vanishes. Thus, the square of the amplitude becomes constant for all partial beams with different polarization planes. All partial beams with different polarization planes have the same energy. This is a depolarized state. The long optical path difference eliminates interference of the beams with the same polarization planes. A single depolarizer only requires such simple conditions ($BL > C$, ratio=2:1).

However, some difficulties will occur when two depolarizers are included in optical paths of a fiber-optic gyroscope. Will no interference between two beams which have once an optical path difference longer than the coherent length by passing through a depolarizer occur forever? Can the function for separating the optical paths of a depolarizer ensure everlasting non-interference between the once separated beams? The two beams can interfere with each other. When two beams pass through the other depolarizer, the birefringence of the second depolarizer will affect against the once-obtained separation between two beams. Sometimes the birefringence will decreases or cancel the path difference which has been endowed by the first depolarizer. In some cases, the optical path difference will become shorter than the coherent length of the light. Then, two beams will interfere! Rotation of polarization planes often occurs in a single-mode fiber, because phase constants of the beams degenerate in a single-mode fiber. If the rotation of the polarization planes occurred, the intensity of the interference beams would fluctuate, because the two once-separated beams with the same polarization planes would interfere. The fluctuation of the interference beams appears as a noise, a drift or change of the scale factors of the signals.

Such a problem would appear in an gyroscope for the first time, when the Inventors introduce two depolarizers into it. Thus, the Inventors have noticed the difficulties in a twin-depolarizer gyroscope for the first time. Nobody take notice of such a problem. A purpose of this invention is to solve the problem of a twin-depolarizer gyroscope.

SUMMARY OF THE INVENTION

To solve the difficulties in a twin-depolarizer gyroscope, a fiber-optic gyroscope of this invention has four birefringent materials A, B, C and D which satisfy the following inequalities;

$$|P_a B_a L_a + P_b B_b L_b + P_o B_o L_o + P_d B_d L_d| - B_5 L_5 > C$$

where $B_a$, $B_b$, $B_o$ and $B_d$ are birefringences of the four birefringent materials A, B, C and D, $L_a$, $L_b$, $L_o$ and $L_d$ are lengths of the birefringent materials A, B, C and D, $B_5 L_5$ is a sum of the products of birefringence and lengths of a fiber coil and couplers. $P_a$, $P_b$, $P_o$ and $P_d$ are triplet factors taking one of the three values $-1$, 0 and $+1$ and C is the coherent length of the light emitted from a light source. Simultaneous null triplet factors are forbidden. Namely, $P_a = P_b = P_o = P_d = 0$ is forbidden. The above inequality contains 40 independent inequalities.

In case of a quasi-depolarize and a complete depolarizer, a fiber-optic gyroscope has three birefringent materials A, C and D which satisfy the following inequalities;

$$|P_a B_a L_a + P_o B_o L_o + P_d B_d L_d| - B_5 L_5 > C$$

where $B_a$, $B_o$ and $B_d$ are birefringences of the three birefringent materials A, C and D, $L_a$, $L_o$ and $L_d$ are lengths of the birefringent materials, $B_5 L_5$ is a sum of the products of birefringences and lengths of a fiber coil and couplers $P_a$, $P_o$ and $P_d$ are triplet factors taking one of the three values $-1$, 0 and $+1$ and C is the coherent length of the light. $P_a = P_o = P_d = 0$ is forbidden. The above inequality contains 13 independent inequalities.

If the birefringences and lengths of the birefringent materials satisfied all equalities, no interference would occur between two depolarizers.

FIG. 1 shows the optical path differences between the beams with different polarization planes as a function of the distance from a starting point in a first depolarizer. The first depolarizer is constructed with two birefringent materials A and B (birefringent crystals or polarization maintaining fibers) coupled with each other with their principal axes twisted at 45 degrees. $L_a$ is a length of the birefringent material A. $B_a$ is birefringence of A. $L_b$ and $B_b$ are a length and birefringence of B. Birefringence B is a difference of refractive indices of ordinary and extraordinary beams. The abscissa of FIG. 1 is a distance from a starting point 0 to a point of the birefringent material A. The ordinate is effective optical path differences of beams propagating in the materials A and B. Owing to the birefringence of material A, beam $\alpha$ and beam $\beta$ with different polarization planes perpendicular to each other have an optical path difference $\Delta W$ which is in proportion to $B_a$ ($= n_{xa} - n_{ya}$). In material A, $\Delta W = B_a x$, where x is the distance from point 0.

In the depolarizer, birefringent materials A and B with lengths $L_a$ and $L_b$ are glued together with optical axes inclining at 45 degrees. Conventional depolarizers have employed the lengths of $L_b = 2L_a$ in order to settle the equation $L_a = L_b - L_a$. Namely, the ratio has been 2:1. However, this invention will expel such a condition without prejudice. This invention will clarify general requirements of coexistence of two depolarizers in a fiber-optic gyroscope.

Optical paths are divided into points D and E at the end of material A with a distance $L_a$. Beam $\alpha$ has a path difference at point D. Beam $\beta$ has a path difference at E. Beam $\alpha$ or $\beta$ coincides with an ordinary beam or extraordinary beam. The absolute values of the paths are insignificant. Only the differences are important. The difference between D and E is $B_a L_a$. The difference DE must be settled to be longer than the coherent length of the light.

The intensity of beam $\alpha$ is not equal to that of beam $\beta$. At point D, beam $\alpha$ is divided exactly in half into beams $\gamma$ and $\delta$, which are ordinary and extraordinary beams in material B. At point E, beam $\beta$ is also divided in half into beams $\epsilon$ and $\zeta$ which are ordinary and extraordinary beams in material B. Beams $\gamma$ and $\epsilon$ have the same polarization. Beams $\delta$ and $\zeta$ have the other same polarization. In spite of the same polarization, the pairs of beams will not interfere, because the beams are separated by $\Delta W = B_a L_a$ which is longer than the coherent length C. When the output of the photodetector is modulated, the cross term of the beams will vanish in the square of amplitude of beams. Extinction of the cross term of the beams is equivalent to non-interference. Survival of the cross term is equivalent to interference between the beams.

At the final end of the second birefringent material B, optical paths of beams $\gamma$, $\epsilon$, $\delta$ and $\zeta$ are denoted by F, G, H and J. The path difference of beam $\gamma$(F) is ($\frac{1}{2} B_a L_a + \frac{1}{2} B_b L_b$). The path difference of beam $\epsilon$ (G) is ($-\frac{1}{2} B_a L_a + \frac{1}{2} B_b L_b$). The difference of beam $\delta$ (H) is ($\frac{1}{2} B_a L_a - \frac{1}{2} B_b L_b$). The difference of beam $\zeta$ (J) is ($-\frac{1}{2} B_a L_a - \frac{1}{2} B_b L_b$). Owing to the birefringence, the optical path length varies according to what paths it propagates. The path length without birefringence is designated as the mean length. All optical path lengths are represented by the differences between the actual path and the mean length. Thus, the path lengths take minus sign as well as plus sign in FIG. 1. In this example, inequality $B_a L_a < B_b L_b$ is assumed. However, the reverse relation is also available. Both cases can be included by taking absolute values in beams $\epsilon$ and $\delta$. If the inequality is reversed, the order of beams $\epsilon$ and $\delta$ are reversed.

The differences FG, GH and HJ have been settled to be longer than the coherent length C. Namely, $B_a L_a > C$, $B_b L_b > C$, and $|B_b L_b - B_a L_a| > C$.

Beams $\gamma$ and $\epsilon$ which have the same polarization do not interfere because of the long separation $B_a L_a$.

Beams $\delta$ and $\zeta$ which have the same polarization do not interfere because of the long separation $B_aL_a$. Light intensity of beam $\gamma$ is equal to that of beam $\delta$, because of the equipartition at point D. Intensity of beam $\epsilon$ is equal to that of beam $\zeta$. Power of the beams with the polarization to one direction X is $|\gamma+\epsilon|^2$, where $\gamma$ and $\epsilon$ mean the amplitude of beams $\gamma$ and $\epsilon$.

Power of the beams with the polarization to another direction Y is given by $|\delta+\zeta|^2$, where $\delta$ and $\zeta$ mean the amplitude of beams $\delta$ and $\zeta$. Because of non-interference between $\gamma$ and $\epsilon$, and between $\delta$ and $\zeta$, the cross terms $\gamma \epsilon$ and $\delta \zeta$ vanish in the squares. Furthermore, $\gamma=\delta$ and $\epsilon=\zeta$. Then, the power $P_x$ of X-polarization is equal to the power $P_y$ of Y-polarization. Since $P_x=P_y$, the output beams have the same power for all directions of polarization. Therefore, the output beams are fully depolarized. This is a principle of a depolarizer.

Conventional depolarizers are provided with birefringent materials whose thicknesses have a typical ratio of 2:1 in order to equalize the path differences $L_a$ and $(L_b-L_a)$ as mentioned before. $L_b=2L_a$, and $B_a=B_b$. Function of a depolarizer has not considered any more. Since this invention includes two depolarizers, interaction between two depolarizers shall be investigated. Nobody has discussed such a matter yet.

FIG. 2 shows variations of optical path differences in the second depolarizer. The second depolarizer includes two birefringent materials C and D. C has a length of $L_o$ and a birefringence of $B_o$. D has a length $L_d$ and a birefringence $B_d$. Point K is an incident end of C. A beam is divided into beams $\eta$ and $\theta$ at point K. The dividing ratio is not necessarily 1:1, since the polarization of the incident beam does not coincide with the optical axis of birefringent material C. Points M and N denote the optical path differences at the junction of C and D. The difference MN is $B_oL_o$. The second material divides beam $\eta$ into $\iota$ and $\kappa$ at point M and divides beam $\theta$ into $\lambda$ and $\mu$ at point N. P, Q, R and S denote the optical path differences at the final end of material D. Beam $\iota$ has a difference of $(\frac{1}{2} B_oL_o+\frac{1}{2} B_dL_d)$ at P. Beam $\lambda$ has $(-\frac{1}{2} B_oL_o+\frac{1}{2} B_dL_d)$ at Q. Beam $\kappa$ has $(\frac{1}{2} B_oL_o-\frac{1}{2} B_dL_d)$ at R. Beam $\mu$ has $(-\frac{1}{2} B_oL_o-\frac{1}{2} B_dL_d)$ at S. Path differences vary according to the selection of paths of beams.

Differences of the nearest neighbours are $PQ=B_oL_o$, $QR=B_dL_d-B_oL_o$, $RS=B_oL_o$. The differences are also settled to be longer than the coherent length C. Namely, $B_oL_o>C$, $B_dL_d>C$ and $|B_dL_d-B_oL_o|>C$.

New problems will be now explained. It is probable that the beams which have been separated beyond the coherent length C by the first depolarizer will submit a reverse change of path lengths and will interfere with each other. Eventually, once separated beams will interfere. Interference will disturb the function of depolarizers.

If no additional differences are yielded by a single-mode fiber connecting two depolarizers, each final end F, G, H and J of the first depolarizer shall be coupled to the initial end K of the second depolarizer for considering all changes of optical paths.

If the first and second depolarizers are fully equivalent, i.e. $B_a=B_b=B_o=B_d$, $L_a=L_o$, $L_b=L_d$. $L_b=2L_a$, $L_d=2L_o$, all the diagrams of paths are shown by FIG. 3. Such the assumption has a high probability, because it is convenient to use two equivalent depolarizers, if two depolarizers are indispensable.

This is a fatal mistake that the Inventors have noticed first. Such a configuration allows once separated beams beyond the coherent length C to come into near within C and to interfere with each other. The function of depolarizers collide each other. Second depolarizer will impair the effect of the first depolarizer. In the configuration, four beams are separated into four sub-beams respectively. At the final end, sixteen beams should be generated. But actually only seven different optical path differences survive as shown in FIG. 3. Final points of beams starting from $K_1$ are denoted by $P_1$, $Q_1$, $R_1$ and $S_1$. Final points of beams originating from $K_2$ are $P_2$, $Q_2$, $R_2$, $S_2$ and so on. Two beams $Q_1$ and $P_2$ coincide. Three beams $R_1$, $Q_2$ and $P_3$ coincide. Only two beams $P_1$ and $S_4$ can keep the separated state. Fourteen of the sixteen beams become interfering, since the path differences vanish for the beams. If the interference revived, the cross terms in the equation of power would not vanish. As the values of the cross terms would fluctuate, the output signal of the detector will also fluctuate. The Inventors discovered the ground of fluctuation basing upon the interaction of plural depolarizers for the first time. The interaction of beams is now called simply "reinterference". To avoid the reinterference, four beams once separated by the first depolarizer shall be further divided into sixteen independent, separated beams which are distanced from each other by more than the coherent length C.

FIG. 4 exhibits another configuration of the first depolarizer of FIG. 1 coupled to the second depolarizer of FIG. 2. Since the space of the figure is confined, the product BL's are written simply by L's. In FIG. 4, $L_a$, $L_b$, $L_o$ and $L_d$ shall be read as $B_aL_a$, $B_bL_b$, $B_oL_o$ and $B_dL_d$ respectively. What is important is that the final points of the paths should not completely coincide with each other. Path differences between the nearest neighbors are written in FIG. 4. If the smallest path difference is longer than the coherent length C, none of two beams among 16 beams reinterfere. The condition of non-interference should be represented by a set of inequalities. The inequalities seem to be hard to be formulated exactly.

However, in this example, the differences of the nearest neighbors should be one of the differences among the four variables $B_aL_a$, $(B_bL_b-B_aL_a)$, $(B_dL_d-B_oL_o)$ and $B_cL_c$ under the assumptions of $B_aL_a<B_bL_b$ and $B_oL_o<B_dL_d$. Therefore, the condition for non-interference is simply given by;

$$|B_aL_a-B_oL_o|<C \qquad (1)$$

$$|(B_bL_b-B_aL_a)-B_oL_o|>C \qquad (2)$$

$$|B_aL_a-(B_dL_d-B_oL_o)|>C \qquad (3)$$

$$|(B_bL_b-B_aL_a)-(B_dL_d-B_oL_o)|>C \qquad (4)$$

Besides these inequalities, some preconditions ($B_aL_a>C$, $B_bL_b>C$, $B_oL_o>C$, $B_dL_d>C$, $B_aL_a<B_bL_b$, $B_oL_o<B_dL_d$) should hold at the same time. These series of inequalities may not be clearly understood. A general expression of the requirements will be presented later.

Use of two equivalent depolarizers can satisfy no inequalities of (1) to (4), because left terms of the inequalities are 0 for equivalent depolarizers.

Another ground of interference will be considered now. A single-mode fiber has rotational symmetry around the central axis. Thus, birefringence, i.e. the difference of refractive indices of two directions will not accompany a single-mode fiber in theory. But even a single-mode fiber is not fully immune from birefringence in practice owing to the fluctuation of rotational symmetry or the external stress. As shown in FIG. 5, the birefringence, i.e. optical path difference along the paths in fiber couplers and a fiber coil must be taken into account. The beams with different polarization planes will actually be separated a little into a single-mode fiber coil or couplers. $B_{5\,1}$ and $L_{5\,1}$ are the birefringence and length of the fiber coil. $B_{5\,2}$ and $L_{5\,2}$ are the birefringence and length of a first coupler. $B_{5\,3}$ and $B_{5\,3}$ are that of a second coupler. The total difference owing to single-mode fibers is denoted by $B_5L_5 = B_{5\,1}L_{5\,1} + B_{5\,2}L_{5\,2} + B_{5\,3}L_{5\,3}$. Nobody has anticipated the effect of the extra birefringence of single-mode fibers upon the function of depolarizers. The birefringence due to single-mode fiber parts will effectively act to decrease the path differences like noise. In other words, the extra, noise birefringence of single-mode fiber parts will act to prolong the coherent length C of the light beams. The extra, noise birefringence can easily be taken into consideration by replacing the coherent length C by $(C+B_5L_5)$. Since the beams also propagate in a single-mode fiber coil and couplers, the inequalities (1) to (4) should be revised as follows;

$$|B_aL_a - B_oL_o| - B_5L_5 > C \qquad (5)$$

$$|(B_bL_b - B_aL_a) - B_oL_o| - B_5L_5 > C \qquad (6)$$

$$|B_aL_a - (B_dL_d - B_oL_o)| - B_5L_5 > C \qquad (7)$$

$$|(B_bL_b - B_aL_a) - (B_dL_d - B_oL_o)| - B_5L_5 > C \qquad (8)$$

The inequalities can completely describe the requirements of no interference under some assumptions among the products of birefringence and the lengths of birefringent materials. The inequalities (5) to (8) shall be always required. They are only a part of necessary conditions. If the assumption were not valid, many other inequalities would be required.

The final ends of path diagram in FIG. 4 show that the number of different paths in two depolarizers is $2^4 = 16$. All the differences between arbitrary two paths must be longer than $(C+B_5L_5)$. The number of selecting two paths from 16 is $16 \times 15/2 = 120$. Thus, 120 inequalities may be produced to express the requirements completely. But 120 inequalities contain several equivalent ones. All inequalities are not independent. Such a figure like FIG. 4 cannot define independent inequalities. It cannot clarify the number of independent inequalities.

Clarification of the number of independent inequalities and the concrete expressions of independent inequalities allows us to establish the invention as a fruitful invention having industrial utility. Thus, a general theory will be explained. The generalization has been done by the Inventors for the first time. It has an unequaled expression.

FIG. 8 demonstrates the manner of selection of optical paths in four birefringent materials A, B, C and D. Selection of paths in material A increases or decreases the optical path length by $B_aL_a/2$ in comparison with no birefringence. Namely, the path length increases by $\pm B_aL_a/2$ in A according to the polarization.

To simplify the expression, a spin $S_a = \pm \frac{1}{2}$ is introduced. Spin is a factor of $-\frac{1}{2}$ or $+\frac{1}{2}$. Spin is originally a quantum mechanical concept for describing angular momenta of quantum particles. But in this invention, spin has not a meaning of angular momentum. As it has two values $\pm\frac{1}{2}$, this invention uses spins in order to describe the change of length. The path length of a beam changes by $S_aB_aL_a$ in A. The path length increases by $S_bB_bL_b$ in B in comparison with non-birefringence. Similarly, the change in C is $S_oB_oL_o$. The increase in D is $S_dB_dL_d$. $S_a$, $S_b$, $S_o$, $S_d = \pm\frac{1}{2}$ in any cases. Thus, the sum W of the path changes in four materials is given by;

$$W = S_aB_aL_a + S_bB_bL_b + S_oB_oL_o + S_dB_dL_d \qquad (9)$$

$$S_a, S_b, S_o, S_d = \pm\frac{1}{2} \qquad (10)$$

There are $2^4 = 16$ ways for selecting paths in four birefringent materials. Selection of paths is numbered by i of 1 to 16 (i = 1−16). Selection i is fully denoted by four spins $S_a{}^i$, $S_b{}^i$, $S_o{}^i$, $S_d{}^i$. Path difference $W^i$ becomes;

$$W^i = S_a{}^iB_aL_a + S_b{}^iB_bL_b + S_o{}^iB_oL_o + S_d{}^iB_dL_d \qquad (11)$$

The difference $W^{ij}$ between different selections $W^i$ and $W^j$ is given by $$W^{ij} = W^i - W^j = (S_a{}^i - S_a{}^j)B_aL_a + (S_b{}^i - S_b{}^j)B_bL_b + (S_o{}^i - S_o{}^j)B_oL_o + (S_d{}^i - S_d{}^j)B_dL_d \qquad (12)$$

What the Inventors want to insist is that all the differences between different path selections must be larger than $(C+B_5L_5)$. The concept of the invention can briefly be described by an inequality $|W^{ij}| > (C+B_5L_5)$. This is a comprehensive but abstract definition of the invention.

More concrete definition shall be presented. The differences of two spins $(S^i - S^j)$ are now called a triplet factor $P^{ij}$. $P_a{}^{ij} = S_a{}^i - S_a{}^j$, $P_b{}^{ij} = S_b{}^i - S_b{}^j$, $P_o{}^{ij} = S_o{}^i - S_o{}^j$, $P_d{}^{ij} = S_d{}^i - S_d{}^j$.

Since spins take only $\pm\frac{1}{2}$, triplet factors take only three values −1, 0 and +1. Thus, the factors are called "triplet". The difference $W^{ij}$ is written by the triplet factors.

$$W^{ij} = P_a{}^{ij}B_aL_a + P_b{}^{ij}B_bL_b + P_o{}^{ij}B_oL_o + P_d{}^{ij}B_dL_d \qquad (13)$$

The requirement $(|W^{ij}| > (C+B_5L_5))$ becomes, $$|P_a{}^{ij}B_aL_a + P_b{}^{ij}B_bL_b + P_o{}^{ij}B_oL_o + P_d{}^{ij}B_dL_d| > (C+B_5L_5) \qquad (14)$$

$$P_a{}^{ij}, P_b{}^{ij}, P_o{}^{ij}, P_d{}^{ij} = -1, 0, +1 \qquad (15)$$

$$i, j = 1, 2, 3, \ldots, 16 \qquad (16)$$

$$i \neq j \qquad (17)$$

This is a complete expression including suffixes i and j. But selection numbers i and j only signify that the triplet factors are different for i and j. But i and j do not signify how to select triplet factors. Triplet factor only takes −1, 0, or +1. Thus, suffixes i and j are not necessary to define the inequality. Therefore, the suffixes are eliminated.

$$|P_aB_aL_a + P_bB_bL_b + P_oB_oL_o + P_dB_dL_d| > (C+B_5L_5) \qquad (18)$$

$$P_a, P_b, P_o, P_d = -1, 0, +1 \qquad (19)$$

$i \neq j$ can be replaced by a condition that all triplet factors $P_a$, $P_b$, $P_o$ and $P_d$ cannot simultaneously be zero. Such the replacement decreases equivalent inequalities. This invention well features this simplified set of inequalities. As four triplet factors take three values independently, total number of inequalities is $3^4=81$. But the case in which all triplet factors are simultaneously zero is forbidden. 80 cases are valid. But an absolute symbol brackets the sum in (18). The replacement of signs + and − by − and + makes a pair of equivalent inequalities. Thus, independent inequalities are clearly obtained. The number of independent inequalities is $80/2=40$.

This invention can be characterized by 40 independent inequalities in the case of four birefringent materials. Spins and triplet factors clarify the concept of this invention. By transferring $B_5L_5$ from the right term to the left term, a variation is obtained, $$|P_aB_aL_a+P_bB_bL_b+P_oB_oL_o+P_dB_dL_d|-B_5L_5>C \quad (20)$$

$$P_a, P_b, P_o, P_d = -1, 0, +1 \quad (21)$$

Then, the same consideration will be done upon another fiber-optic gyroscope having an independent depolarizer and a quasi-depolarizer coupled with a polarizer. This gyroscope includes two depolarizers also. However, the number of birefringent materials is not four but three. FIG. 9 shows such a simplified gyroscope. As mentioned before, it was proposed by Patent Application No. 3-198534 or Patent Application No. 4-139899 of the Inventors. Enlarged views of a first and second depolarizers are depicted. Birefringent material A is spliced to an end of a polarizer with the axis inclining at 45 degrees to the allowable axis of the polarizer. The first depolarizer is a quasi-depolarizer which is constructed only with a single birefringent material. Material B in FIG. 6 is omitted.

A second depolarizer is placed near the fiber coil. This is an independent one produced by coupling two birefringent materials C and D with their optical axes inclining at 45 degrees. This fiber-optic gyroscope comprises three birefringent materials A, C, and D. Birefringences and lengths of A, C and D are denoted by $B_a$, $B_o$, $B_d$ and $L_a$, $L_o$, $L_d$. The condition for non-interference shall be considered for the simplified gyroscope.

First of all, the reason why a quasi-depolarizer can be built by a single birefringent material and a polarizer will be explained by referring to FIG. 10. Birefringent material A is coupled to a front end of a polarizer. The axis of A inclines at 45 degrees to the allowable axis of the polarizer. The optical paths are depleted below. A beam enters the birefringent material A at point 0. The beam is divided into beams $\nu$ and $\xi$ with different polarization planes perpendicular to each other. As the material A has birefringence $B_a$, the path difference between beams $\nu$ and $\xi$ is $B_aL_a$ at a rear end of A, where $L_a$ is a length of A. Beam $\nu$ is divided at point D in half into beams o and $\pi$. Beam o has the polarization parallel with the allowable axis of the polarizer. Beam $\pi$ has the polarization parallel with the forbidden axis of the polarizer. Similarly beam $\xi$ is divided in half into beams $\rho$ and $\sigma$. The polarization of beam $\rho$ is parallel with the allowable axis. The polarization of beam $\sigma$ is parallel with the forbidden axis. Thus beams $\pi$ and $\sigma$ vanish in the polarizer. Only beams o and $\rho$ can pass through the polarizer without loss. Beams o and $\rho$ are separated by $B_aL_a$ owing to the birefringence. Since the divisions at D and E are exactly 1:1 due to the 45° twisting coupling, the power of beams which can pass through the polarizer is half of the power of the incident beam.

A depolarizer in front of a polarizer is installed in order to let half of light energy pass through the polarizer, irrespective of the initial state of polarization. The coupling of the material A and a polarizer in FIG. 10 succeeds in letting half of the initial power pass through the polarizer. Thus, the material A plays a role of a depolarizer lying in front of a polarizer.

FIG. 11 shows variations of optical paths regarding polarization. Beams are only three times divided in this configuration. Time of division is reduced by one. The configuration is simpler than the former one of FIG. 4. A first depolarizer yields a path difference $DE=B_aL_a$ by material A whose thickness and birefringence are denoted by $L_a$ and $B_a$. A second depolarizer consists of two birefringent materials C and D. $B_o$, $B_d$ and $L_o$, $L_d$ are birefringences and lengths of C and D. Material C separates beam D into beams F and H with different polarization planes. Beam E is divided into beams G and J with different polarization planes. The path differences FH and GJ are $B_oL_o$. Beams F and G have the same polarization. Beams H and J have the other same polarization. Four beams are divided into eight beams by material D. Eight different beams at the final end of the material D are numbered by S, T, U, V, W, X, Y and Z in turn. Path differences of the points are;

$$S = (B_aL_a+B_oL_o+B_dL_d)/2, T = (-B_aL_a+B_oL_o+B_dL_d)/2, U = (B_aL_a-B_oL_o+B_dL_d)/2, V = (-B_aL_a-B_oL_o+B_dL_d)/2, W = (B_aL_a+B_oL_o-B_dL_d)/2, X = (-B_aL_a+B_oL_o-B_dL_d)/2, Y = (B_aL_a-B_oL_o-B_dL_d)/2, Z = (-B_aL_a-B_oL_o-B_dL_d)/2$$

The order of the path differences S, T, U, V, W, X, Y and Z depends on the order of $B_aL_a$, $B_oL_o$ and $B_dL_d$. All path differences must be longer than $(C+B_5L_5)$ from the idea of this invention. This requirement is similar to the former gyroscope having four birefringent materials. In this gyroscope having three materials, eight parameters exist. All the differences between two arbitrary parameters of eight must be longer than $(C+B_5L_5)$. Thus, 28 inequalities may be yielded. However, all inequalities are not independent. Equivalent inequalities are included in the 28 inequalities. It may be possible to restrict the number of inequalities by assuming the order of $B_aL_a$, $B_oL_o$ and $B_dL_d$. But it will lack a generality.

Thus, a general expression shall be deduced now. A beam is divided into two beams at point 0. Two beams have the same polarization plane and the same intensity, but have different path lengths. The path increases or decreases by $B_aL_a/2$. Then, spin $S_a$ is now defined to express $\pm\frac{1}{2}$. $S_a=\pm\frac{1}{2}$. The path change at material A is comprehensively written by $S_aB_aL_a$. Similarly, the path changes by $S_oB_oL_o$ at birefringent material C, where spin $S_o=\pm\frac{1}{2}$. Finally, material D gives the four beams path change $S_dB_dL_d$, where $S_d=\pm\frac{1}{2}$.

Total path difference W becomes $$W=S_aB_aL_a+S_oB_oL_o+S_dB_dL_d \quad (22)$$

W adopts eight different values according to the selection of spins. The selection of spins corresponds to eight points S, T, U, V, W, X, Y and Z in FIG. 11. Selection of paths is denoted by i, where i is 1, 2, 3 ... or 8. Path selection i has path length difference $W^i$.

$$W^i=S_a^iB_aL_a+S_o^iB_oL_o+S_d^iB_dL_d \quad (23)$$

The difference $W^{ij}$ between two path selections i and j is given by;

$$W^{ij} = W^i - W^j = (S_a{}^i - S_a{}^j)B_aL_a + (S_o{}^i - S_o{}^j)B_oL_o + (S_d{}^i - S_d{}^j)B_dL_d \quad (24)$$

Since spins take either $-\frac{1}{2}$ or $+\frac{1}{2}$, the differences of two spins are $-1$, $0$, or $+1$. The differences are designated by triplet factors $P_a$, $P_o$ and $P_d$. $P_a{}^{ij} = S_a{}^i - S_a{}^j$, $P_o{}^{ij} = S_o{}^i - S_o{}^j$, $P_d{}^{ij} = S_d{}^i - S_d{}^j$. $W^{ij}$ is written by using triplet factors, $$W^{ij} = P_a{}^{ij}B_aL_a + P_o{}^{ij}B_oL_o + P_d{}^{ij}B_dL_d \quad (25)$$

This invention requires that all path differences between arbitrary two selections of path shall be longer than $(C+B_5L_5)$. $|W^{ij}| > (C+B_5L_5)$ for all pairs of selections i and j. Explicit expression of the inequality is $$|P_a{}^{ij}B_aL_a + P_o{}^{ij}B_oL_o + P_d{}^{ij}B_dL_d| > (C+B_5L_5) \quad (26)$$

$$P_a{}^{ij}, P_o{}^{ij}, P_d{}^{ij} = -1, 0, +1 \quad (27)$$

$$i,j = 1, 2, 3, \ldots, 8 \quad (28)$$

$$i \neq j \quad (29)$$

As the triplet factor takes three values $-1$, $0$, and $+1$ independently, (26) expresses $3^3 = 27$ inequalities. But case i=j should be eliminated. Thus, the case wherein all triplet factors are zero, which is equivalent to i=j, is eliminated. The number of inequalities reduces to 26. Furthermore, as the left hand term is bracketed by an absolute symbol, replacement of $-$ to $+$ or $+$ to $-$ will produce only an equivalent inequality. Therefore, the number of independent inequalities is reduced by half to 13. The requirements can be simplified by eliminating suffixes i and j from triplet factors.

$$|P_aB_aL_a + P_oB_oL_o + P_dB_dL_d| - B_5L_5 > C \quad (30)$$

$$P_a, P_o, P_d = -1, 0, +1 \quad (31)$$

$(P_a = P_o = P_d = 0 \text{ is forbidden})$

This invention deals with a fiber-optic gyroscope having two depolarizers. A first depolarizer is provided between a light source and a polarizer. This is either an independent one or a dependent one on a polarizer. A second depolarizer is installed in the vicinity of a fiber coil. An independent depolarizer has two birefringent materials (e.g. polarization maintaining fiber, birefringent crystals) coupled to each other with their optical axes inclining at 45 degrees. A dependent depolarizer has a single birefringent material glued to a polarizer with the axis inclining at 45 degrees to the allowable axis of the polarizer. Nobody has taken notice of the problems of two-depolarizer gyroscope. The Inventors have discovered mutual interference between two depolarizers. If two equivalent depolarizers were mounted in a fiber-optic gyroscope, mutual interference would occur. The interference will induce an offset and drift of the output signal, because the interference impairs the action of depolarizers. Occurrence of the offset and drift will prevent from measuring an angular velocity exactly. The Inventors have considered the conditions of occurrence of mutual interference of two depolarizers. This invention clarifies requirements for suppressing the interference regarding the birefringences and lengths of the birefringent materials of depolarizers.

According to the invention, the depolarizers can achieve the inherent function.

The requirements are settled by replacing the inherent coherent length C by $(C+B_5L_5)$. Even if a single-mode fiber coil or couplers are accompanied with birefringence, the offset or drift is not induced by the extra birefringence due to a fiber coil or couplers. This invention can provide a fiber-optic gyroscope with a stable scale factor and no drift.

BRIEF DESCRIPTION OF THE DRAWINGS

FIG. 11 is a diagram of optical path selections in the fiber-optic gyroscope of FIG. 10 for showing that various path differences will be generated by three birefringent materials A. C and D.

DETAILED DESCRIPTION OF THE PREFERRED EMBODIMENTS

Figure 1:
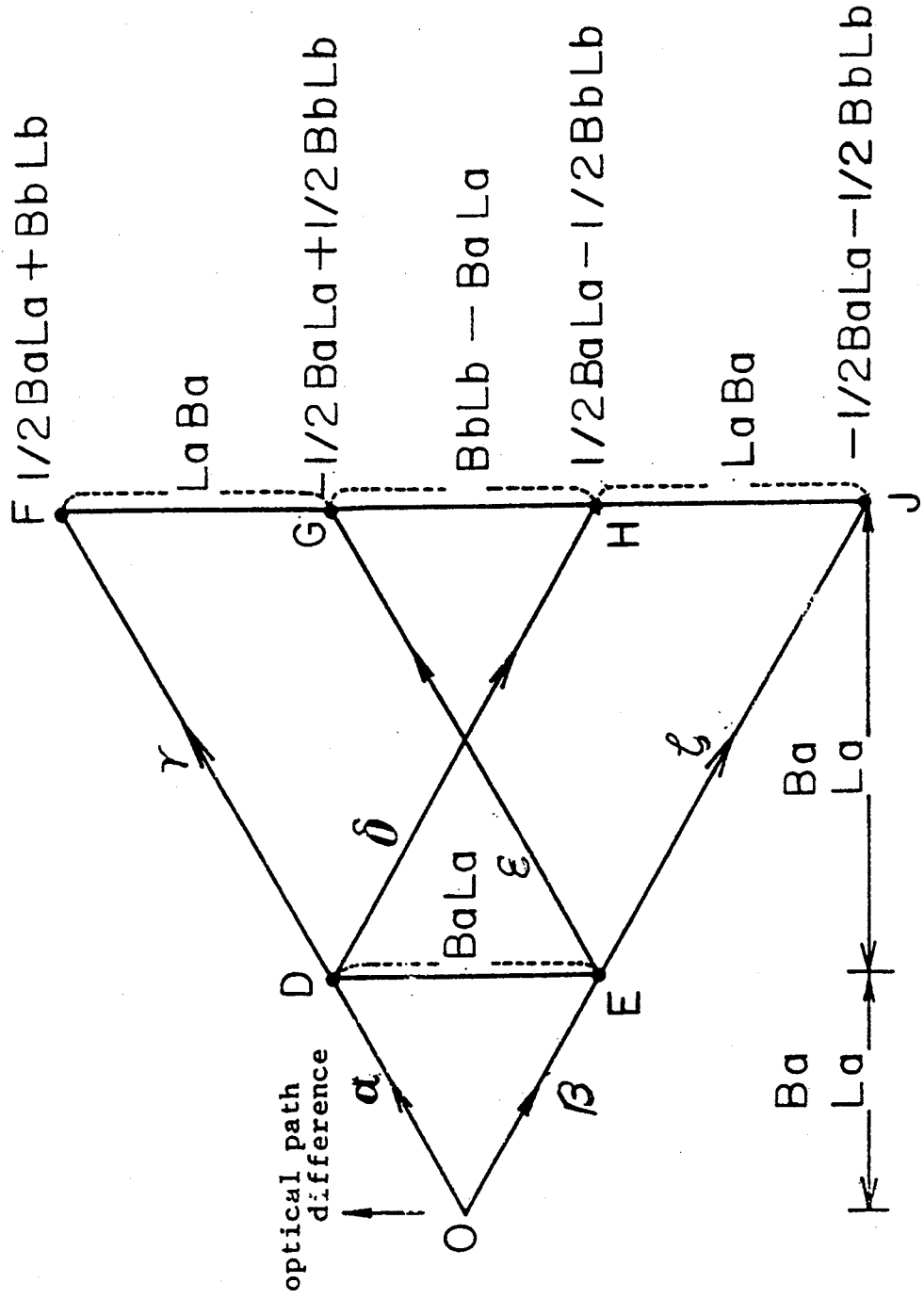
FIG. 1 is a diagram for showing the optical path differences produced in the birefringent materials for the beams with different polarization planes as a function of the distance from the beginning end 0 of the first depolarizer.
Figure 2:
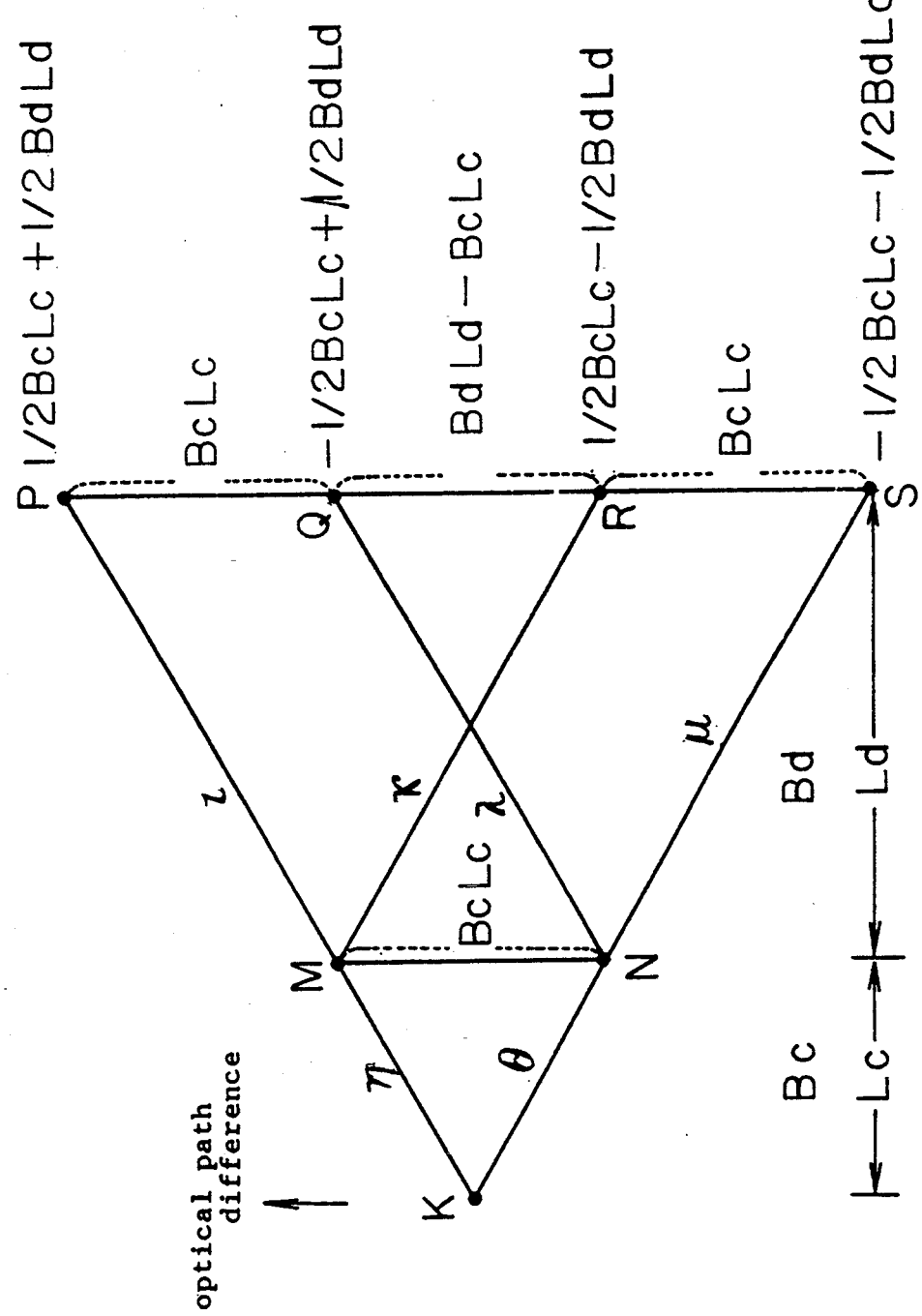
FIG. 2 is a diagram for showing the optical path differences induced in the birefringent materials for the beams with different polarization planes as a function of the distance from the beginning end K of the second depolarizer.
Figure 3:
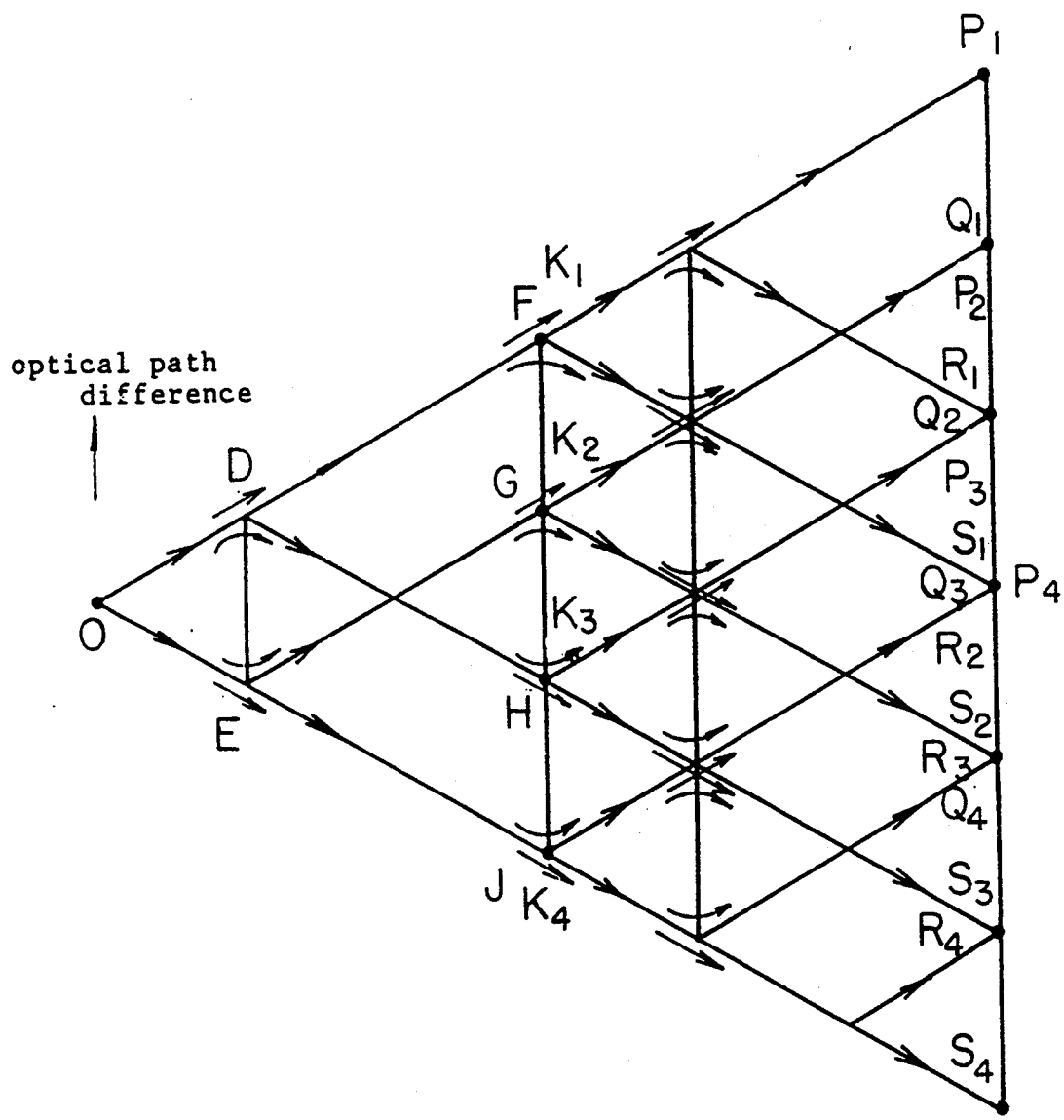
FIG. 3 is a diagram for showing the optical path differences in two depolarizers in which interference occurs between the once-separated beams.
Figure 4:
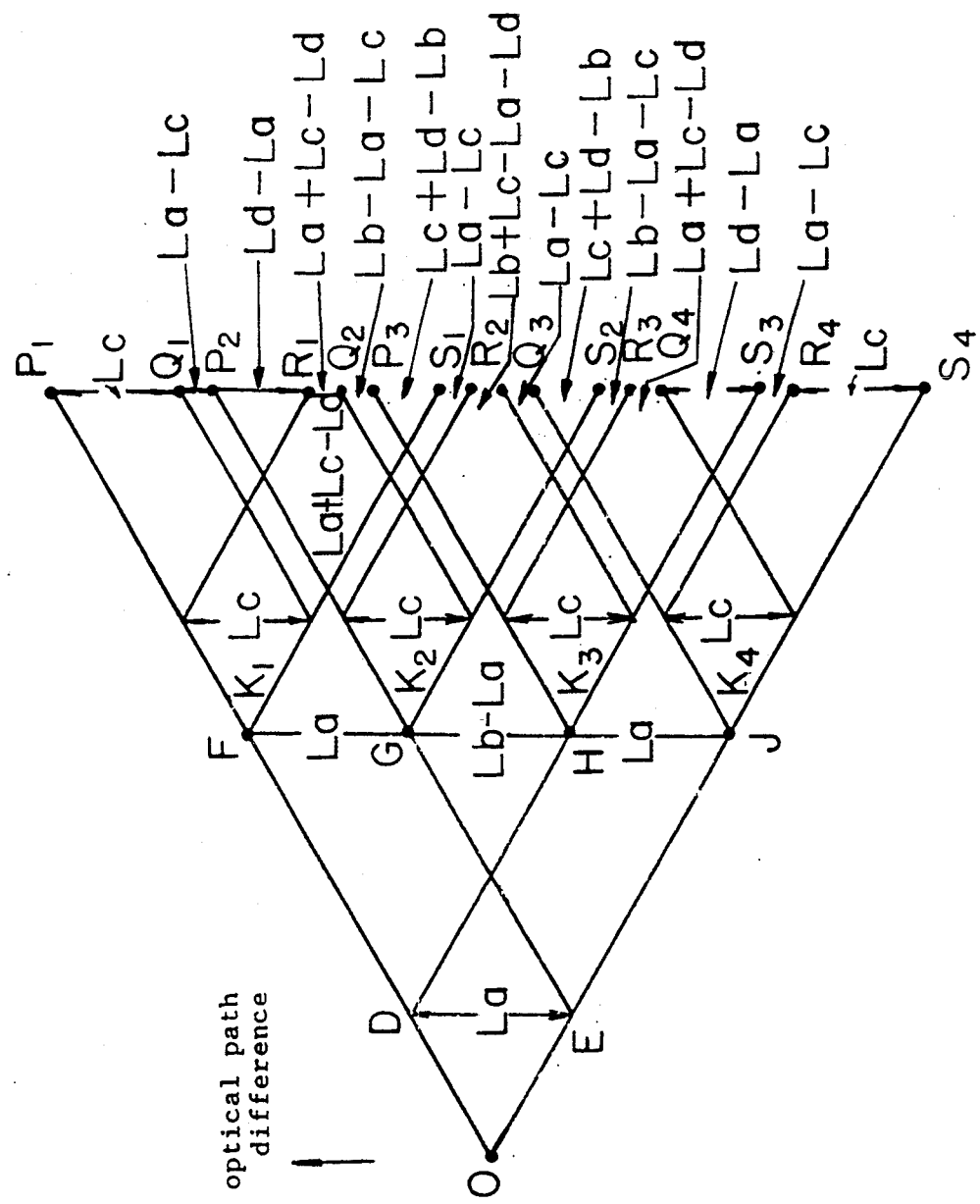
FIG. 4 is a diagram of the optical path differences in a gyroscope of this invention in which no interference occurs because of differences of path lengths.
Figure 5:
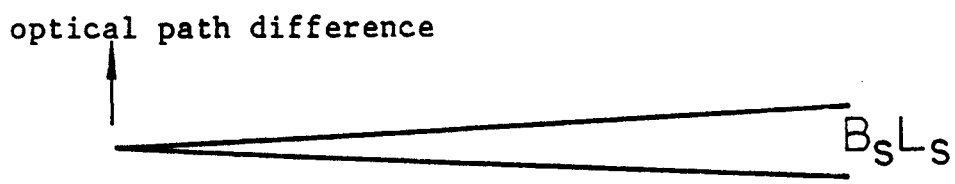
FIG. 5 is a diagram for showing extra birefringence in a single-mode fiber coil or couplers.
Figure 7:
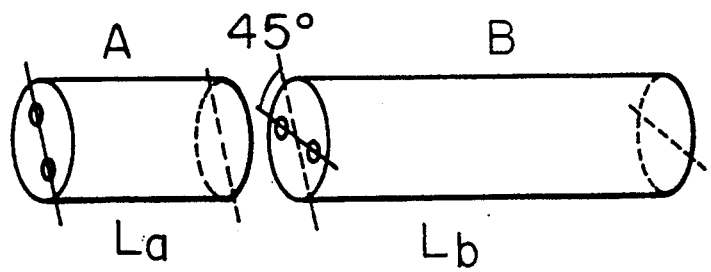
FIG. 7 is a perspective, schematic view of a depolarizer having two polarization maintaining fibers with principal axes inclining at 45 degrees.
Figure 8:
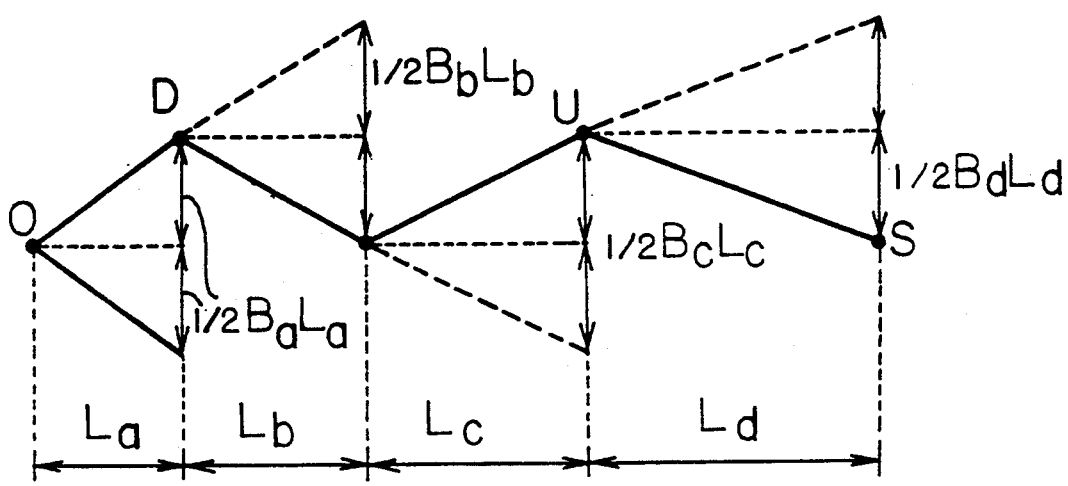
FIG. 8 is a diagram for showing that the total path difference is obtained by adding or subtracting by half of the products BL of birefringent materials.
Figure 6:
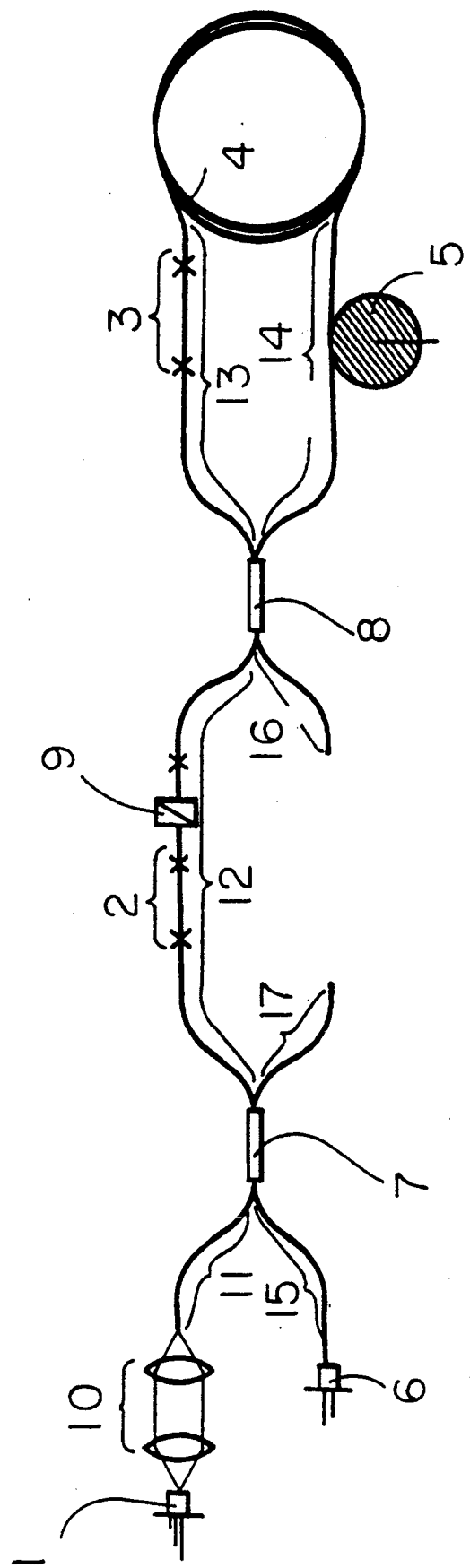
FIG. 6 is a schematic view of a fiber-optic gyroscope with two depolarizers of this invention in which the depolarizers are constructed by two birefringent materials.

FIG. 6 shows a fiber-optic gyroscope having two independent depolarizers as an embodiment of this invention. This gyroscope can be built almost all parts with optical fibers. The gyroscope comprises a light source (1), a first depolarizer (2), a second depolarizer (3), a fiber coil (4), a phase modulator (5), a photodetector (6), a first fiber coupler (7), a second fiber coupler (8) and a polarizer (9). These parts are connected by single-mode fibers. A polarization prism, polarization plate, metal-dielectric multi-layer, or fiber-type polarizer can be employed as a polarizer. If a fiber-type polarizer is adapted, all the optical paths can be made from optical fibers.

A light source (1) emits semi-monochromatic beams with a pertinent width of wavelength spectrum. A laser diode or superluminescent diode can be used as the light source (1). The coherent length of the light source must be short enough in order to avoid inconveniences. A depolarizer is a device to convert linear polarization, circular polarization or elliptical polarization into non-polarized state. The first depolarizer (2) lies between the first fiber coupler (7) and the polarizer (9). The second depolarizer (3) is installed between the fiber coil (4) and the second fiber coupler (8).

The first depolarizer (2) is built by splicing two polarization maintaining fibers with their optical axes inclining at 45 degrees to each other. Two fibers have the same birefringence, i.e. $B_a = B_b = B_1$.

Lengths $L_a$ and $L_b$ of the fibers are settled first by the condition that the optical path difference of the beams with different polarization planes should be longer than the coherent length of the light emitted from the light source. X and Y are principal axes of a polarization maintaining fiber. The beam of X-polarization has a refractive index $n_x$. The beam of Y-polarization has a refractive index $n_y$. $L_a$ and $L_b$ are lengths of the fibers. C is the coherent length of the light.

The conditions are clearly described by;

$$(n_x-n_y)L_a > C, (n_x-n_y)L_b > C, (n_x-n_y)|L_b-L_a| > C \quad (32)$$

where $(n_x - n_y) > 0$ is assumed. Since $B_a = B_b = B_1 = n_x - n_y$, they become $$B_1 L_a > C, B_1 L_b > C, B_1 |L_b - L_a| > C \quad (33)$$

Similar inequalities holds also for the second depolarizer ($B_o = B_d = B_2$)

$$B_2 L_o > C, B_2 L_d > C, B_2 |L_d - L_o| > C \quad (34)$$

These conditions are well-known. This invention requires new conditions for overcoming the extra birefringence $B_5 L_5$ due to a fiber coil or couplers.

$$B_1 L_a - B_5 L_5 > C \quad (35)$$

$$B_1 L_b - B_5 L_5 > C \quad (36)$$

$$B_2 L_o - B_5 L_5 > C \quad (37)$$

$$B_2 L_d - B_5 L_5 > C \quad (38)$$

$$B_1 |L_a - L_b| - B_5 L_5 > C \quad (39)$$

$$B_1 |L_d - L_o| - B_5 L_5 > C \quad (40)$$

Furthermore, this invention requires in addition new, important conditions for avoiding the interference between two depolarizers which will induce fluctuation of the output signal in addition. In the case of $L_b > L_a$ and $L_d > L_o$, the following conditions shall be added;

$$|B_1 L_a - B_2 L_o| - B_5 L_5 > C \quad (41)$$

$$|B_1(L_b - L_a) - B_2 L_o| - B_5 L_5 > C \quad (42)$$

$$|B_1 L_a - B_2(L_d - L_o)| - B_5 L_5 > C \quad (43)$$

$$|B_1(L_b - L_a) - B_2(L_d - L_o)| - B_5 L_5 > C \quad (44)$$

If the lengths of four birefringent materials comply with these inequalities, four beams which have been separated beyond C by the first depolarizer never interfere with each other, because the second depolarizer divides four beams into sixteen beams, and any differences between which are longer than C.

Four beams which have passed through the first depolarizer go into the polarizer. Only the beams with the polarization parallel with the allowable axis of the polarizer survive after the polarizer. Someone may think that some one of four beams with different path lengths would vanish and less than four beams would remain. But it is wrong. In general, the optical axes of the first depolarizer do not coincide with the forbidden axis of the polarizer. Thus, all four beams can pass through the polarizer with some loss which is in proportion to cosine of the angle between the polarization and the forbidden axis. All four beams will submit to the change of path length in the second depolarizer. Of course, only such beams having the same polarization will interfere. But the single-mode fiber sometimes rotates the polarization of beams. Thus, all 16 beams divided by the second depolarizer have a probability of interference. However, if the lengths comply with the conditions of (41) to (44), no interference will occur between the sixteen beams.

Since depolarizers have been fully explained so far, other parts will be described. The fiber coil (4) is a single-mode fiber wound many times around a bobbin. The phase modulator (5) is a piezoelectric oscillator (cylindrical or columnar shape) on which an extra part of single-mode fiber of the fiber coil (4) is wound. When AC voltage is applied to electrodes of piezoelectric oscillator, it expands or shrinks at the modulation frequency. Then, the fiber repeats to expand or shrink at the same frequency. The phase of the beam transmitting there also changes at the modulation frequency.

A photodetector (6), e.g. a pin photodiode lets the clockwise-propagating beam and the counterclockwise-propagating beam interfere and detects the intensity of the interference beam. The fiber coupler (7) or (8) is produced by peeling the coating of two fibers, letting the peeled parts adjoin each other, melting the parts by heating, coupling them on sides and stretching the molten part. The distance between two cores of the fibers becomes so short that two cores can be coupled by evanescent waves. Besides a fiber coupler, a beam splitter can be employed as a coupler.

A polarization prism, fiber-type polarizer, metal dielectric multi-layer can be used as the polarizer (9). A fiber-type polarizer consists of a polarization maintaining fiber wound around a bobbin. Two modes of beams with different polarization planes which are perpendicular to each other propagate in the fiber. Bending of the fiber dissipates energy of one mode. Another mode survives. Thus, the coiled polarization maintaining fiber plays a role of a polarizer.

Optical fiber paths will be now explained. First path (11) connects the light source (1) to the first fiber coupler (7). This is a single-mode fiber. A converging optics (10), e.g. lenses provided between the light source (1) and an end of the first path (11). Second path (12) connects the first fiber coupler (7) to the second fiber coupler (8). Third and fourth paths (13) and (14) are end parts of the fiber coil (4). Both third and fourth paths are connected to the second coupler (8). Fifth path (15) connects the photodetector (6) to the first coupler (7). Sixth path (16) is an extra end of the second fiber coupler (8). Seventh path (17) is an extra end of the coupler (7).

The polarizer (9) is provided midway in the second oath (12) between the first and second couplers. In many eases, the light beam emitted from the light source (1) is linearly-polarized. The beam is depolarized by the first depolarizer (2). The polarizer allows half of power of beams to pass through it with a definite polarization parallel with the allowable axis. Since the beams are once depolarized, the power of the beams which have passed through the polarizer is exactly half of the initial power, irrespective of the polarization of the initial beams. The depolarizer can dispense with difficult adjustments of the directions of the light source and polarizer. Accidental rotation of polarization in a single-mode fiber induced by external force, magnetic fields, or temperature fluctuation does not affect the power of the beams at the rear end of the polarizer.

Then, the beam is divided by the second coupler (8) into two beams in half. One beam transits through the second depolarizer (3), propagates in the fiber coil (4) as a clockwise beam, passes through the phase modulator (5) and returns to the second coupler (8). The other beam first passes through the phase modulator (5), propagates in the fiber coil (4) as a counterclockwise beam, transits through the second depolarizer (3) and returns to the second coupler (8). The second depolarizer (3) enables half of power of the beams to pass through the polarizer (9), irrespective of the state of polarization of the beams in the fiber coil (4).

The phase modulator (5) applies a modulation signal to the phase of the beam. A modulated counterclockwise beam and clockwise beam enter the photodetector (6) and interfere with each other there. The phase difference between the clockwise and counter-clockwise beams is obtained by a synchronous demodulation of the output of the photodetector.

Figure 9:
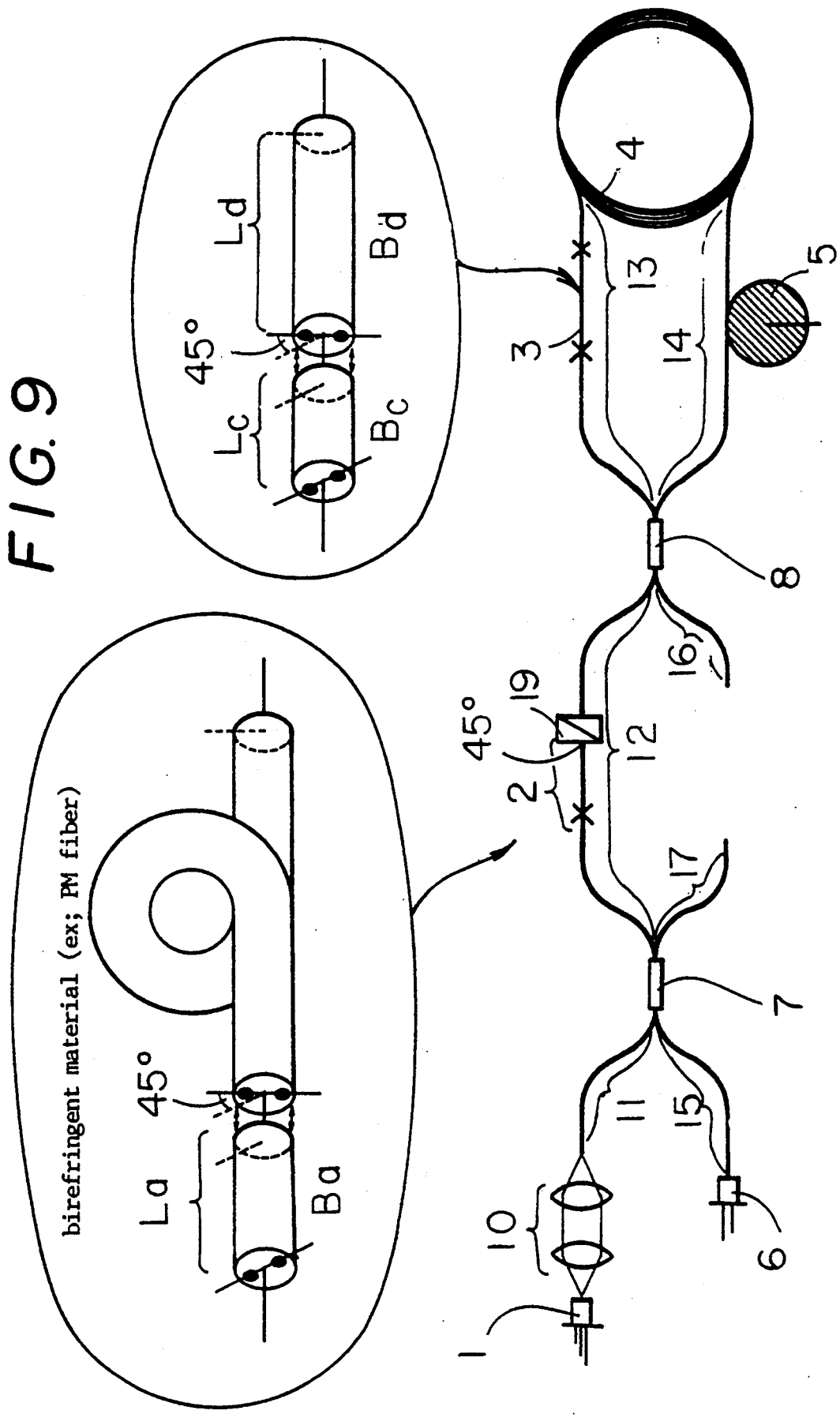
FIG. 9 is a schematic view of another fiber-optic gyroscope with a quasi-depolarizer and an independent depolarizer of this invention in which the quasi-depolarizer is constructed with a single birefringent material spliced to a polarizer with axes inclining at 45 degrees.
Figure 10:
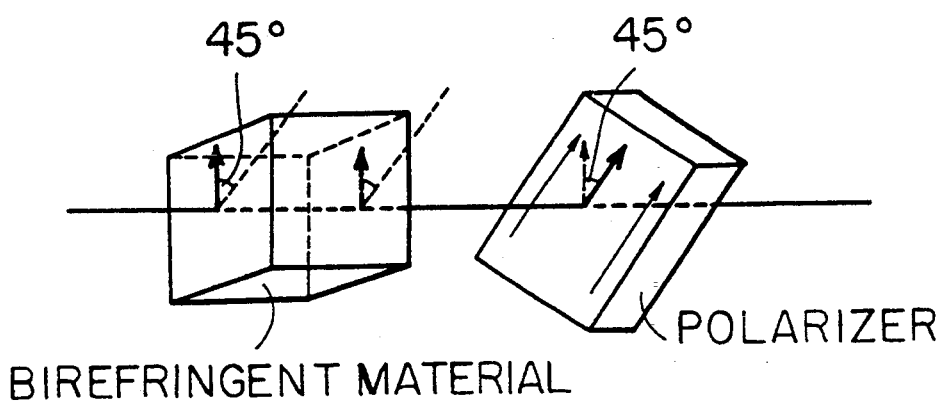
FIG. 10 is a perspective view of a birefringent material and polarizer and a diagram for the optical paths in the depolarizer.
Figure 10:
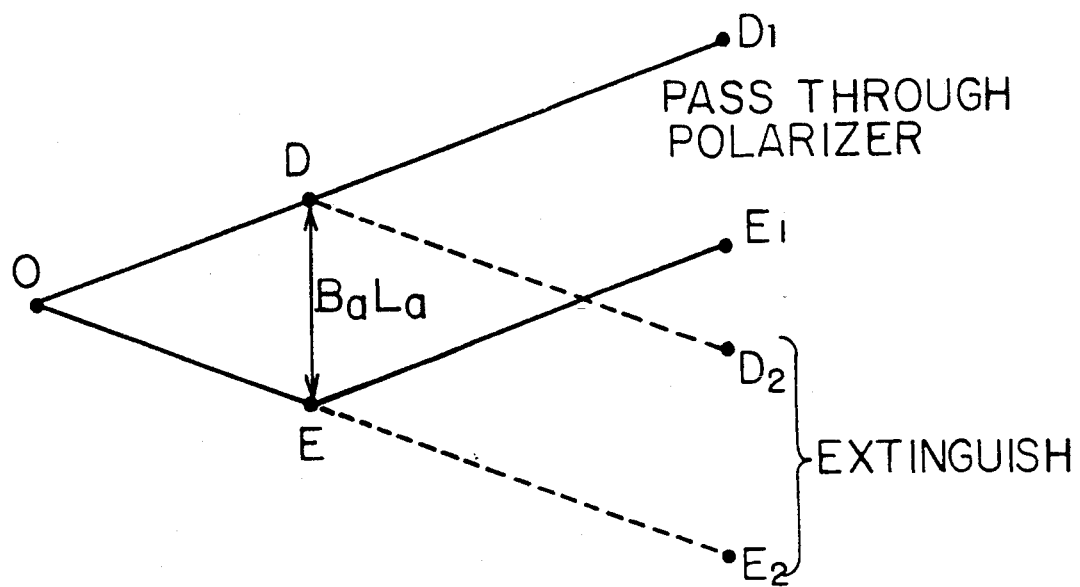

Another embodiment of this invention demonstrated in FIG. 9 will be explained. A first depolarizer (2) is constructed with a single birefringent material and a polarizer (19). The requirements for the path lengths are simplified as follows;

$$|P_aB_aL_a + P_oB_oL_o + P_dB_dL_d| - B_5L_5 > C$$
$$P_a, P_o, P_d = -1, 0, +1 \quad (45)$$

Other functions are the same as the former embodiment.

What we claim is:

1. A fiber-optic gyroscope for measuring an angular velocity of a fiber coil from a phase difference between a clockwise-propagating beam and a counter-clockwise-propagating beam when light beams are transmitted clockwise and counter-clockwise in the fiber coil comprising:

a light source for emitting a semi-monochromatic light;

a fiber coil made from a single-mode fiber wound many times for letting beams propagate clockwise and counterclockwise therein;

a photodetector for letting a clockwise-propagating beam and a counterclockwise-propagating beam interfere with each other and for detecting intensity of interfering beams;

a polarizer for converting a circularly-polarized, elliptically-polarized or linearly-polarized beam into a linearly-polarized beam with a definite polarization plane parallel with an allowable axis;

a first path communicating with the light source;

a second path in which the polarizer is provided;

a third path and a fourth path as extra parts of the fiber coil;

a fifth path communicating with the photodetector;

a first coupler for connecting the first path and the fifth path to the second path;

a second coupler for connecting the third path and the fourth path to the second path;

a first depolarizer provided between the light: source and the polarizer for depolarizing light beams;

a second depolarizer provided in the third path or fourth path for depolarizing light beams, the beams emitted from the light source being depolarized by the first depolarizer and entering the polarizer, the first depolarizer being constructed by coupling a first birefringent material A of birefringence $B_a$ and a length $L_a$ to a second birefringent material B of birefringence $B_b$ and a length $L_b$ with optical principal axes inclining at 45 degrees to each other, the second depolarizer being constructed by coupling a third birefringent material C of birefringence $B_o$ and a length $L_o$ to a fourth birefringent material D of birefringence $B_d$ and a length $L_d$ with optical principal axes inclining at 45 degrees to each other, in which the birefringence and lengths of birefringent materials A, B, C and D satisfy inequalities;

$$|P_aB_aL_a + P_bB_bL_b + P_oB_oL_o + P_dB_dL_d| - B_5L_5 > C$$

where $P_a$, $P_b$, $P_o$, and $P_d$ are triplet factors for materials A. B, C and D which take independently one of three values $-1$, 0, or $+1$ but do not take 0 at the same time, C is a coherent length of the light emitted from the light source, $B_5L_5$ is a sum of products of birefringence and length of the single-mode fiber coil and the couplers.

2. A fiber-optic gyroscope as claimed in claim 1, wherein $L_d = 2L_o$ and $B_d = B_o$ in the second depolarizer, and the lengths of birefringent materials satisfy an inequality:

$$|B_aL_a - B_oL_o| - B_5L_5 > C.$$

3. A fiber-optic gyroscope as claimed in claim 1, wherein the couplers are fiber couplers which are made from fibers by peeling coatings of fibers, adjoining peeled parts, melting and stretching ends of the fibers for connecting two fibers in order to obtain evanescent coupling of light.

4. A fiber-optic gyroscope as claimed in claim 1, wherein the couplers are beam splitters.

5. A fiber-optic gyroscope as claimed in claim 1, wherein the polarizer is a fiber-type polarizer produced by winding a polarization maintaining fiber as a coil in order to dissipate energy of light with a polarization in a direction and to pass energy of light with another polarization without loss.

6. A fiber-optic gyroscope as claimed in claim 1, wherein the second depolarizer is produced by splicing two polarization maintaining fibers with principal axes inclining at 45 degrees to each other.

7. A fiber-optic gyroscope as claimed in claim 1, wherein the first depolarizer is produced by splicing a polarization maintaining fiber with the polarizer, the principal axis being twisting at 45 degrees to the allowable axis of the polarizer.

8. A fiber-optic gyroscope as claimed in claim 1, wherein the light source is a superluminescent diode.

9. A fiber-optic gyroscope as claimed in claim 1, wherein the light source is a laser diode with a broad spectrum of wavelength of light.

10. A fiber-optic gyroscope for measuring an angular velocity of fiber coil from a phase difference between a clockwise-propagating beam and a counter-clockwise-propagating beam when light beams are transmitted clockwise and counter-clockwise in the fiber coil comprising:
- a light source for emitting a semi-monochromatic light;
- a fiber coil made from a single-mode fiber wound many times for letting beams propagate clockwise and counterclockwise therein;
- a photodetector for letting a clockwise-propagating beam and a counterclockwise-propagating beam interfere with each other and for detecting intensity of interfering beams;
- a polarizer for converting a circularly-polarized, elliptically-polarized or linearly-polarized beam into a linearly-polarized beam with a definite polarization plane parallel with an allowable axis;
- a first path communicating with the light source;
- a second path in which the polarizer is provided;
- a third path and a fourth path as extra parts of the fiber coil;
- a fifth path communicating with the photodetector;
- a first coupler for connecting the first path and the fifth path to the second path;
- a second coupler for connecting the third path and the fourth path to the second path;
- a first depolarizer provided between the light source and the polarizer for depolarizing light beams;
- a second depolarizer provided in the third path or fourth path for depolarizing light beams,
- the beams emitted from the light source being depolarized by the first depolarizer and entering the polarizer,
- the first depolarizer being constructed by coupling a first birefringent material A of birefringence $B_1$ and a length $L_a$ to a second birefringent material B of birefringence $B_1$ and a length $L_b$ with optical principal axes inclining at 45 degrees to each other,
- the second depolarizer being constructed by coupling a third birefringent material C of birefringence $B_2$ and a length $L_o$ to a fourth birefringent material D of birefringence $B_2$ and a length $L_d$ with optical principal axes inclining at 45 degrees to each other, in which the birefringence and lengths of birefringent materials A, B, C and D satisfy inequalities in the case of $L_a < L_b$ and $L_o < L_d$;

$B_1 L_a - B_5 L_5 > C$ $B_2 L_o - B_5 L_5 > C$ $|B_1(L_b - L_a)| - B_5 L_5 > C$ $|B_2(L_d - L_o)| - B_a L_a > C$ $|B_1 L_a - B_2 L_o| - B_5 L_5 > C$ $B_1(L_b - L_a) - B_2 L_o| - B_5 L_5 > C$ $B_1 L_a - B_2(L_d - L_o)| - B_5 L_5 > C$ $|B_1(L_b - L_a) - B_2(L_d - L_o)| - B_5 L_5 > C$ where C is a coherent length of the light emitted from the light source, $B_5 L_5$ is a sum of products of birefringence and lengths of the single-mode fiber coil and the couplers.

11. A fiber-optic gyroscope as claimed in claim 10, wherein the lengths of birefringent materials A and B satisfy $L_b = 2L_a$, the lengths of birefringent materials C and D satisfy $L_d = 2L_o$, and the lengths of birefringent materials A and C satisfy an inequality;

$|B_1 L_a - B_2 L_o| - B_5 L_5 > C.$

12. A fiber-optic gyroscope for measuring aft angular velocity of fiber coil from a phase difference between clockwise-propagating beam and a counterclockwise-propagating beam when light beams are transmitted clockwise and counter-clockwise in the fiber coil comprising:
- a light source for emitting a semi-monochromatic light of a coherent length of C;
- a fiber coil made from a single-mode fiber wound many times for letting beams propagate clockwise and counterclockwise therein;
- a photodetector for letting a clockwise-propagating beam and a counterclockwise-propagating beam interfere with each other and for detecting intensity of interfering beams;
- a polarizer with an allowable axis and a forbidden axis for converting a circularly-polarized, elliptically-polarized or linearly-polarized beam into a linearly-polarized beam with a definite polarization plane parallel with an allowable axis;
- a first path communicating with the light source;
- a second path in which the polarizer is provided;
- a third path and a fourth path as extra parts of the fiber coil;
- a fifth path communicating with the photodetector:
- a first coupler for connecting the first path and the fifth path to the second path;
- a second coupler for connecting the third path and the fourth path to the second path;
- a first depolarizer provided between the light source and the polarizer for depolarizing light beams;
- a second depolarizer provided in the third path or fourth path for depolarizing light beams,
- the beams emitted from the light source being depolarized by the first depolarizer and entering the polarizer,
- the first depolarizer being constructed by coupling a first birefringent material A of birefringence $B_a$ and a length $L_a$ to the polarizer with optical principal axes inclining at 45 degrees to the allowable axis,
- the second depolarizer being constructed by coupling a birefringent material C of birefringence $B_o$ and a length $L_o$ to another birefringent material D of birefringence $B_d$ and a length $L_d$ with optical principal axes inclining at 45 degrees to each other, in which the birefringence and lengths of birefringent materials A, C and D satisfy inequalities;

$|P_a B_a L_a + P_o B_o L_o + P_d B_d L_d| - B_5 L_5 > C$ where $P_a$, $P_o$, and $P_d$ are triplet factors for material A, C and D which take independently one of three values $-1$, $0$, or $+1$ but do not take 0 simultaneously, $B_5 L_5$ is a sum of products of birefringence and length of the single-mode fiber coil and the couplers.

13. A fiber-optic gyroscope as claimed in claim 12, wherein $L_d = 2L_o$ and $B_d = B_o$ in the second depolarizer, and the lengths of birefringent materials satisfy an inequality;

$$|B_a L_a - B_o L_o| - B_5 L_5 > C.$$

14. A fiber-optic gyroscope as claimed in claim 12, wherein the couplers are fiber couplers which are made from fibers by peeling coatings of fibers, adjoining peeled parts, melting and stretching ends of the fibers for connecting two fibers in order to obtain evanescent coupling of light.

15. A fiber-optic gyroscope as claimed in claim 12, wherein the couplers are beam splitters.

16. A fiber-optic gyroscope as claimed in claim 12, wherein the polarizer is a fiber-type polarizer produced by winding a polarization maintaining fiber as a coil in order to dissipate energy of light with a polarization in a direction and so pass energy of light with another polarization without loss.

17. A fiber-optic gyroscope as claimed in claim 12, wherein the second depolarizer is produced by splicing two polarization maintaining fibers with principal axes inclining at 45 degrees to each other.

18. A fiber-optic gyroscope as claimed in claim 12, wherein the first depolarizer is produced by splicing a polarization maintaining fiber with the polarizer, the principal axis being twisting at 45 degrees to the allowable axis of the polarizer.

19. A fiber-optic gyroscope as claimed in claim 12, wherein the light source is a superluminescent diode.

20. A fiber-optic gyroscope as claimed in claim 12, wherein the light source is a laser diode with a broad spectrum of wavelength of light.

* * * * *